(12) United States Patent
Venz

(10) Patent No.: US 6,595,341 B1
(45) Date of Patent: Jul. 22, 2003

(54) ALUMINUM-COATED PLASTIC MEMBER

(75) Inventor: Rainer Venz, Weisendorf (DE)

(73) Assignee: Luk Lamellen und Kupplungsbau Beteiligungs KG, Buhl (DE)

( * ) Notice: Subject to any disclaimer, the term of this patent is extended or adjusted under 35 U.S.C. 154(b) by 40 days.

(21) Appl. No.: 09/662,508

(22) Filed: Sep. 15, 2000

Related U.S. Application Data

(63) Continuation of application No. PCT/EP99/01067, filed on Feb. 18, 1999.

(30) Foreign Application Priority Data

Mar. 18, 1998 (DE) .......................... 198 11 655

(51) Int. Cl.⁷ .......................... F16D 21/00; F01B 11/02; F16J 1/04; F16J 9/00
(52) U.S. Cl. .............. 192/91 R; 192/91 A; 192/85 AA; 192/85 C; 192/85 CA; 92/169.1; 92/222; 92/223; 92/248
(58) Field of Search ................. 428/220, 323, 428/411.1, 688, 689, 704, 539.5, 457; 192/91 R, 91 A, 85 AA, 85 C, 85 CA; 92/169.1, 222, 223, 248

(56) References Cited

U.S. PATENT DOCUMENTS

| | | | | |
|---|---|---|---|---|
| 4,516,479 A | * | 5/1985 | Vadasz .......................... 92/170 |
| 4,756,771 A | * | 7/1988 | Brodalla et al. ............. 148/6.1 |
| 5,654,054 A | * | 8/1997 | Tropsha et al. ............. 428/36.6 |
| 5,884,600 A | * | 3/1999 | Wang et al. ............. 123/193.6 |
| 5,941,162 A | * | 8/1999 | Kiesel .......................... 92/245 |
| 6,040,059 A | * | 3/2000 | Birkner et al. ............. 428/469 |

FOREIGN PATENT DOCUMENTS

| | | | |
|---|---|---|---|
| GB | 2222213 A | * | 2/1990 |
| JP | 53004737 | | 1/1978 |
| JP | 53049070 | | 5/1978 |
| JP | 60168121 | | 8/1985 |
| JP | 02233575 | | 9/1990 |
| JP | 07035257 | | 2/1995 |

* cited by examiner

Primary Examiner—Paul Thibodeau
Assistant Examiner—Sheeba Ahmed
(74) Attorney, Agent, or Firm—Darby & Darby

(57) ABSTRACT

A composite part of a clutch for use in a motor vehicle has a plastic carrier and a film of oxidized aluminum or an aluminum alloy overlying and adhering to that part of the carrier which is in sliding contact with at least one other part of the clutch. Oxidizing of the film is the result of a chemical or electrochemical treatment.

10 Claims, 1 Drawing Sheet

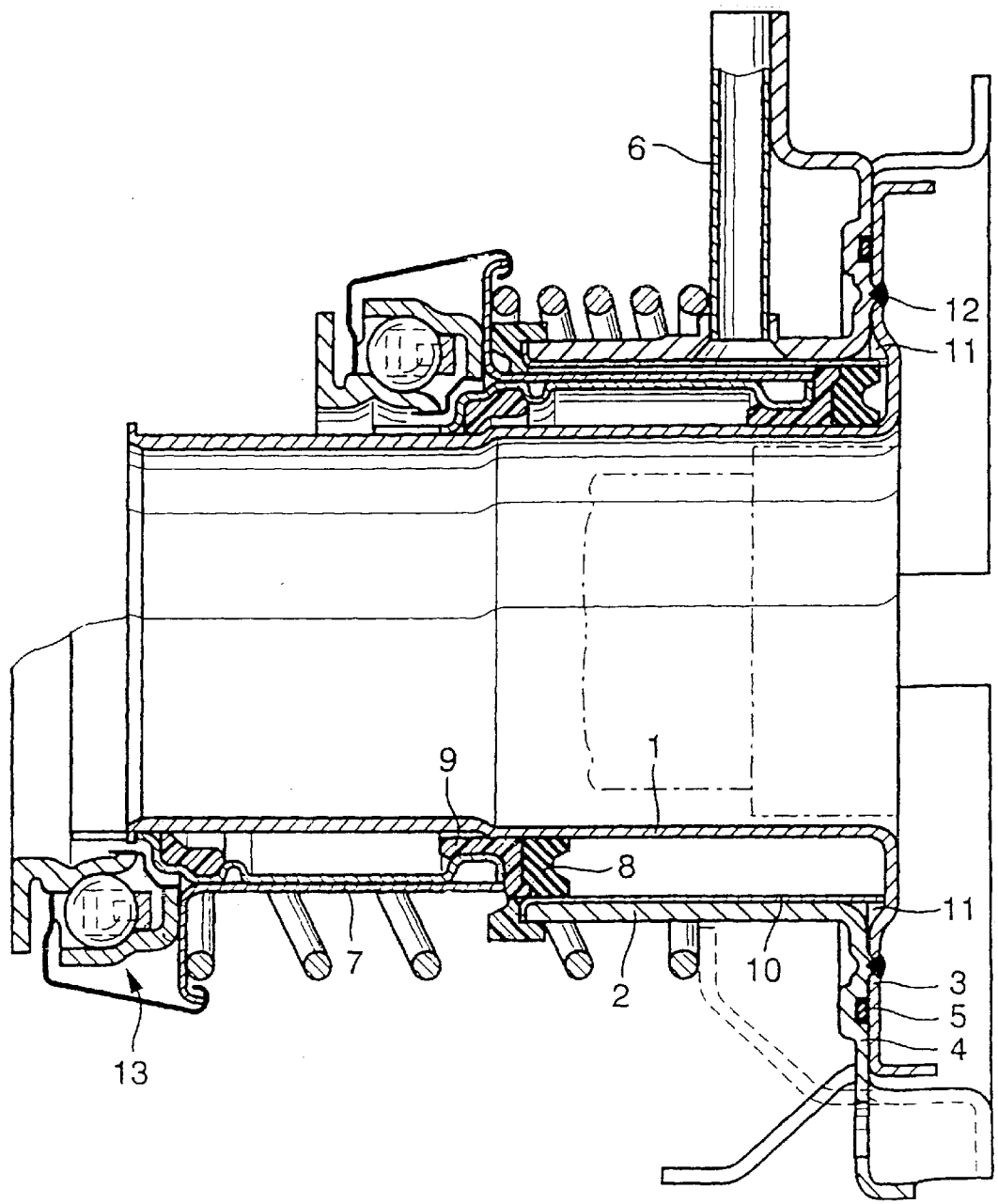

ALUMINUM-COATED PLASTIC MEMBER

This is a continuation of International Application No. PCT/EP99/01067, file Feb. 18, 1999, the entire disclosure of which is incorporated herein by reference.

BACKGROUND OF THE INVENTION

The invention relates to improvements in methods of enhancing certain properties of parts which are made of a plastic material. The invention also relates to processed plastic parts which have undergone a treatment in accordance with the improved method. More particularly, the invention relates to improvements in parts of the type wherein a plastic carrier is coated, at least in part, with a film of aluminum or an aluminum alloy.

The German-language book entitled "Kunststoff-Metallisieurung" (meaning "Metallizing of Synthetic Plastic Materials"), published in 1991 by Eugen G. Leuze Verlag, Saulgau/Wdrttemberg, Federal Republic Germany, discloses (on page 75) a computer housing which is made of a plastic material and is provided with a layer of aluminum for the purpose of limiting the amount of electromagnetic radiation issuing from the computer. Page 83 of the same publication discloses the coating of polyester or polycarbonate foils with aluminum films. The purpose of such films is to render the foils impermeable to hydraulic fluids. The aforementioned publication fails to disclose or suggest the possibility of producing films or layers of aluminum or an aluminum alloy on shaped plastic articles for the purpose of imparting to such shaped articles a pronounced impermeability to fluids and/or other desirable properties in addition to or in lieu of impermeability to electromagnetic radiation.

OBJECTS OF THE INVENTION

An object of the present invention is to provide a novel and improved method of rendering shaped plastic products resistant to corrosion which is caused by climatic conditions and/or various chemicals with a pH in the range of between 5 and 8.

Another object of the instant invention is to provide a method which enables a shaped plastic article or product to constitute a highly satisfactory electric insulator.

A further object of the invention is to provide a method which enables a plastic product to resist penetration by a toxic substance.

An additional object of the invention is to provide a method which enables a shaped plastic product to with stand pronounced mechanical stresses, such as deforming stresses, as well as to withstand friction-induced wear.

Still another object of the invention is to provide a method which ensures that the shaped plastic article and its coating canot be readily separated from each other.

A further object of the invention is to provide a shaped plastic product wherein the feature that the article can exhibit the above-enumerated and/or other desirable characteristics contributes to the eye-pleasing appeal of the article.

Another object of the invention is to provide a simple but efficient and inexpensive method of enhancing one or more desirable characteristics of shaped plastic articles.

An additional object of the invention is to provide a clutch or another component part of a motor vehicle wherein one or more constituents are shaped plastic articles which have undergone a treatment in accordance with the present invention.

Still another object of the present invention is to provide a novel and improved actuating mechanism for utilization in or in conjunction with the clutch of a motor vehicle.

SUMMARY OF THE INVENTION

One feature of the present invention resides in the provision of an article of manufacture which is a shaped partly metallic and partly plastic member and comprises a plastic component having a surface, and an aluminum-containing oxidized metallic component which overlies and adheres to a portion or to the entire surface of the aforementioned plastic component. Adherence of the metallic component is the result of a chemical or an electrochemical treatment of the metallic component.

The metallic component can comprise or consist of aluminum oxide or of an oxide of an aluminum alloy.

The metallic component is or can constitute a layer or film having a thickness of between about 5 and 100 $\mu$m.

Furthermore, the metallic component can comprise at least one coloring agent, and such metallic component can constitute a densified layer or film containing a material which is aluminum or an aluminum alloy.

The chemical or electrochemical treatment is or can be such that the metallic component is impermeable to fluids and/or that the metallic component exhibits a pronounced resistance to at least one of (a) penetration by fluids and (b) friction-induced wear.

The components (i.e., the partly metallic and partly plastic member) can form part of a clutch for motor vehicles. For example, the components can form part of a hydraulic cylinder which, in turn, can form part of an engaging-disengaging unit for clutches of motor vehicles.

Another feature of the present invention resides in the provision of a clutch for motor vehicles. The clutch comprises a cylinder member and a piston member which is reciprocable in the cylinder member. One of these members has a friction surface which is in sliding contact with a surface of the other member, and the one member includes a plastic component and a metallic component which is bonded to the plastic component and has a surface constituting at least a portion of the aforementioned friction surface. The metallic component consists of or contains oxidized aluminum and adheres to the plastic component as a result of a chemical treatment or an electrochemical treatment.

The thickness and/or the color of the plastic component can be selected as described hereinbefore. The same holds true for the permeability of the metallic component and/or for its resistance to wear.

The novel features which are considered as characteristic of the invention are set forth in particular in the appended claims. The improved member itself, both as to its composition and the modes of making and utilizing the same, together with numerous additional important features and attributes thereof, will be best understood upon perusal of the following detailed description of certain preesently preferred specific embodiments with reference to the accompanying drawing.

BRIEF DESCRIPTION OF THE DRAWING

The single FIGURE of the drawing is an axial sectional view, of a cylinder and piston unit, with the upper and lower halves of the piston shown in two different axial positions and with a part of the cylinder constructed and treated in accordance with a feature of the present invention.

DESCRIPTION OF PREFERRED EMBODIMENTS

The drawing shows a portion of a hydraulically operated clutch engaging-disengaging unit wherein a composite cylinder includes a radially inner cylindrical wall 1 and a concentric radially outer cylindrical wall 2. These walls are made of a suitable metallic sheet material and are respectively provided with radially outwardly extending annular flanges 3 and 4 partially overlying each other and being bonded to one another by at least one circumferentially complete welded seam 12 or by an annular array of discrete spot welds. The reference character 5 denotes a resilient sealing element which is recessed into an annular groove at the outer side of the flange 4.

The cylinder including the parts 1, 2, 3, 4 and 12 receives a reciprocable hollow piston 7 which, in the illustrated embodiment, is made of suitable metallic sheet stock. The front end face of the piston 7 carries a sealing ring 8 having a grooved front side and being movable back and forth in the annular space between the walls 1, 2 of the composite cylinder. A ring-shaped support 9 is provided between the front end of the piston 7 and the sealing ring 8. The rear end of the piston 7 is configured to support an antifriction ball bearing 13.

The outer side of the wall 2 is provided with an inlet for one end of a radially outwardly extending tubular nipple 6 which serves to supply a hydraulic fluid to the composite cylinder including the walls 1, 2. The nipple 6 is soldered, welded or otherwise sealingly secured to the wall 2.

In order to reduce the overall axial length of the cylinder-piston unit including the cylinder having the parts 1 to 4 and the piston 7, the internal surface of the wall 2 surrounds a tubular intermediate member 10 the front end portion of which abuts the adjacent (inner) side of the flange 3 to define therewith an annular compartment 11. The latter establishes a path for the flow of hydraulic fluid from the nipple 6, along the front end portion of the member 10 and into the interior of the composite cylinder. The sealing ring 8 is slidable along the external surface of the wall 1 and the internal surface of the member 10.

In accordance with a feature of the invention, the member 10 is a prefabricated article which is made of a plastic material and its internal surface carries a layer or film of aluminum or aluminum alloy. Such layer or film (hereinafter called film for short) is applied by resorting to a vaporizing step followed by an oxidizing step. The vaporizing step can involve the procedure known as CVD (chemical vapor deposition), namely a separation of aluminum atoms from the gaseous phase. The thickness of the film of aluminum which deposits at the inner side of the tubular plastic member 10 can vary within a wide range, such as between about 5 and 100 $\mu$m. In the illustrated embodiment, the internal surface of the member 10 is assumed to be provided with an aluminum containing film having a thickness which equals or approximates 100 $\mu$m. The next-following step, i.e., the oxidizing step, can involve a conventional technique, e.g., the so-called d-c current sulphuric acid technique (known as GS process) which can be carried out under the following circumstances:

| Composition: | |
|---|---|
| Sulphuric acid $H_2SO_4$ $(1.84 \text{ g/cm}^3)$ | 280 g/l |
| Aluminum sulphate $Al_2(SO_4) \times 18\, H_2O$ | 25 g/l |
| Operating conditions: | |
| Density at 20° C. | 1.18–1.29 g/cm³ |
| Temperature | 18–20° C. |
| Current density | 1.5 A/dm² |
| Voltage | 10–15 V |
| Switching of the workpieces | anodic |
| Growth of thickness of the film | 1 $\mu$m in 2–33 minutes |
| Movement | with compressed air |
| Cathode | aluminum cathode |
| Surface ratio anode:cathode | 1:1 |

By resorting to such GS process, the thus developed aluminum oxide film had a thickness of 60 $\mu$m. The $Al_2O_3$ film at the inner side of the tubular plastic member 10 has been found to ensure that the inner side of the entire member 10 (namely of that length of the film which is contacted by the piston 7 in actual use of the cylinder-piston unit) had a uniform thickness and the film was highly resistant to corrosion as well as to friction induced wear, i.e., the seal between the ring 8 and the plastic member was capable of standing long periods of use.

An important advantage of the improved product and of the method of making such product is that they allow for numerous additional uses of shaped plastic products in fields and under circumstances where basically (i.e., primarily) plastic products were considered to lack the required properties for long-lasting use. Furthermore, such additional uses of largely plastic products can be achieved by resorting to relatively simple techniques which are well known in certain other fields, namely for interception of electromagnetic radiation and/or for enhancing the impermeability of sheets made of polyester or polycarbonate.

By resorting to the novel technique of coating shaped plastic products with films of aluminum or an aluminum alloy, and of thereupon subjecting the products and their films to a chemical or electrochemical treatment, one can take advantage of numerous desirable properties of $Al_2O_3$, namely:

The $Al_2O_3$ film adheres strongly to the aluminum layer because it is obtained from the aluminum layer.

The finished film exhibits a highly desirable and advantageous resistance to corrosion under adverse climatic conditions and while exposed to chemicals at a pH value in the range of between 5 and 8.

The film enhances the sales appeal of the shaped plastic member because the latter appears to have been made of a metallic material.

The film enhances the resistance of the ultimate product to mechanical stresses in that it exhibits a pronounced hardness as well as pronounced resistance to wear.

The film is an excellent electrical insulator.

The film is not toxic.

As used herein, the term "plastic" is intended to embrace macromolecular and essentially organic materials which are obtained synthetically, either entirely or in part.

The establishment of a desired oxide film, which is to reinforce the natural oxide film on the coated plastic member, can be obtained as a result of a chemical or electrochemical treatment. Chemical oxidation can involve dipping an aluminum- or aluminum alloy-coated shaped plastic member into a chemical bath or spraying the chemical substance onto the aluminum-containing film. The chemical which is sprayed onto the film can contain any one of a variety of alkaline or acidic oxidant-containing solutions. Depending upon the nature (such as acidity or alkalinity) of the oxidizing bath or spray, the finished film can exhibit any desired property or any one of combinations of two or more properties.

It is often preferred to resort to an electrochemical treatment in order to obtain an aluminum oxide layer exhibiting the desired properties or characteristics. The plastic member which carries a film of aluminum or aluminum alloy is connected with the anode and is inserted, together with a counterelectrode, into an electrolyte. The two poles are connected to a source of d-c current. The thus released oxygen reacts with the surface of the aluminum film already during its developmental stage. In addition, oxide layers can develop upon the cleaned aluminum surfaces in response to treatment with boiling water or with water vapors. The thickness of the thus obtained boehmite (crystalline, colorless, water-containing aluminum oxide AlOOH) is relatively low.

As already, mentioned hereinbefore, the oxide layer can have a thickness in the range of between about 5 and 100 $\mu$m. Basically, the buildup and the exact thickness of the film depend upon the duration of treatment and upon the selection of current strength. An advantage of the feature that the thickness of the film can vary within the aforementioned wide range is that the novel treatment can be resorted to in connection with the making of a variety of plastic parts which must undergo a treatment (i.e., the surfaces of which must be provided with an aluminum layer, either entirely or in part). Otherwise stated, the final products can be put to any one of a wide variety of different uses. The exact thickness of the aluminum-containing film depends upon the intended use of the finished product and upon the required or desirable characteristics of such product.

It is further possible to enhance the appearance (and hence the sales appeal) of the ultimate product by ensuring that the aluminum-containing film exhibits any one of a number of different colors. Such coloring treatment can involve dipping of the freshly obtained film into (a) the aqueous solution of an organic coloring agent or (b) an inorganic salt. It is presently preferred to resort to the solution (a); for example, the aqueous solution can contain alizarine, indigo, a metallic complex and/or others. It has been found that the coloring action is particularly satisfactory if the aluminum-containing film has a thickness which is not less than 20 $\mu$m.

As a rule, the coloring treatment with inorganic coloring agents is carried out in two stages, preferably as follows: The first stage or step involves the introduction of a certain percentage of coloring agent into the pores of the aluminum-containing film. The next stage or step involves conversion with additional chemicals or a hydrolysis with water. The thus induced reactions initiate the development (in the pores) of various colors such as yellow, bronze, gold or brownhues. Suitable coloring agents include iron(III)-ammonium oxalate and cobalt acetate with potassium permanganate.

It is often desirable to densify the oxide layer. Such step can constitute an important final stage of the anodic oxidation treatment. In many instances, adequate densification is required to ensure reliable and long-lasting protection of the film against mechanical and/or other influences. Adequate densification of the anodic oxide layer guarantees reliable closing of the pores in that the film absorbs crystalline water. Such closing of the pores enhances the resistance of the film to corrosion and to undesirable mechanical influences.

As shown in the drawing, the improved shaped article including the plastic sleeve 10 and the aluminum oxide film thereon can be utilized with advantage in the power train of a motor vehicle, e.g., as a component or constituent of a clutch engaging-disengaging cylinder and piston unit. Thus, the film can be brought into frequent sealing contact or can be maintained in continuous sealing contact with the surface of a mobile part (such as the sealing ring 8 on the piston 7) to prevent leakage of a hydraulic fluid. In such instances, the ability of the $Al_2O_3$ film to stand pronounced stresses which could cause extensive wear upon the part 8 and/or 10, and the ability of the film to withstand corrosive influences are of particular importance for long-lasting reliable operation of the clutch and the engaging-disengaging means therefor.

Clutches which can be engaged or disengaged by hydraulic cylinder and piston units are disclosed, for example, in commonly owned U.S. Pat. Nos. 5,135,091 (granted Aug. 4, 1992 to Fischer et al; for "METHOD OF REGULATING THE OPERATION OF A TORQUE TRANSMISSION APPARATUS"), 5,725,456 (granted Mar. 10, 1998 to Fischer et al. for "METHOD OF REGULATING OPERATION OF A TORQUE TRANSMISSION APPARATUS"), and 5,632,706 (granted May 27, 1997 to Kremmling et al. for "MOTOR VEHICLE WITH ELECTRONIC CLUTCH MANAGEMENT SYSTEM"). The disclosures of the above-enumerated U.S. patents, as well as that in commonly owned. German priority application Ser. No. 198 11 655.1 filed Mar. 18, 1998, are incorporated herein by reference.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of making partly plastic and partly metallic shaped articles and, therefore, such adaptations should and are intended to be comprehended within the meaning and range of equivalence of the appendedd claims.

What is claimed is:

1. A clutch for motor vehicles, the clutch comprising:

an actuator cylinder with a cylinder member and a piston member reciprocable in the cylinder member, one of said members having a friction surface in sliding contact with a sliding surface of the other of said members, wherein said one member is formed of a plastic material and a metallic layer is bonded to the one member at least in an area comprising the sliding surface, wherein an outer surface of the metallic layer in at least the sliding surface area has an oxidized metal layer that is formed as a result of a treatment selected from the group consisting of chemical treatments and electrochemical treatments.

2. The clutch of claim 1, wherein said oxidized metal layer comprises a film of aluminum oxide.

3. The clutch of claim 1, wherein said oxidized metal layer comprises an oxide of an aluminum alloy.

4. The clutch of claim 1, wherein said metallic layer is a film having a thickness in the range of between about 5 and 100 $\mu$m.

5. The clutch of claim 1, wherein said metallic layer comprises at least one coloring agent.

6. The clutch of claim 1, wherein said metallic layer is a densified layer containing a material selected from the group consisting of aluminum and aluminum alloys.

7. The clutch of claim 1, wherein said oxidized metal layer is impermeable to fluids.

8. The clutch of claim 1, wherein said oxidized metal layer exhibits a pronounced resistance to at least one of (a) penetration by fluids and (b) friction-induced wear.

9. The clutch of claim 1, wherein said one member forms part of a hydraulic cylinder.

10. The clutch of claim 1, wherein said one member forms part of an engaging-disengaging unit for clutches of motor vehicles.

* * * * *